H. HERMANSEN & G. A. KOFOED.
MACHINE FOR PRODUCING INTERLOCKING TILES OF CEMENT.
APPLICATION FILED FEB. 15, 1912.
1,118,281.
Patented Nov. 24, 1914.
3 SHEETS—SHEET 1.
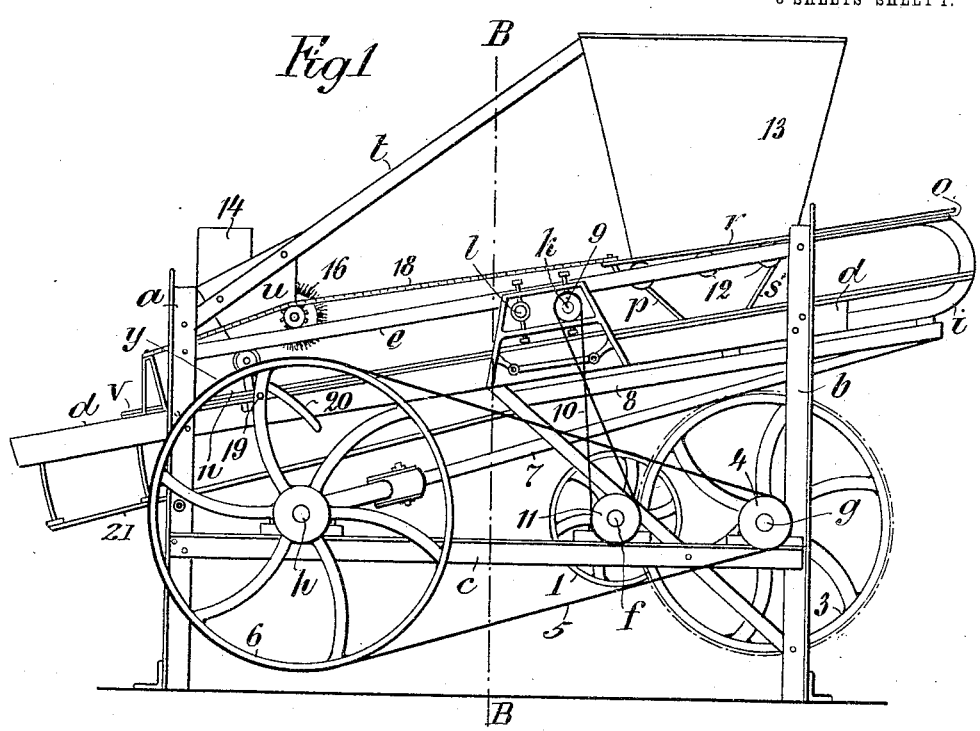
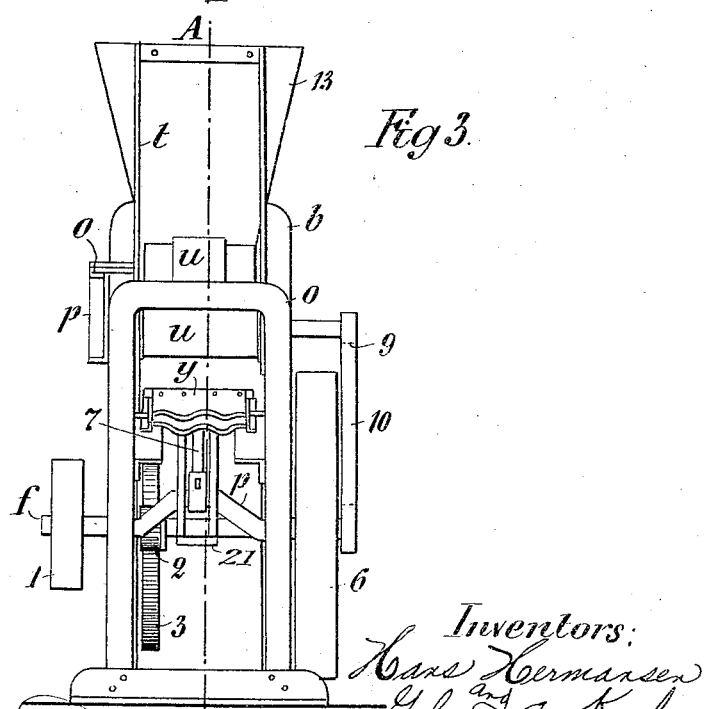

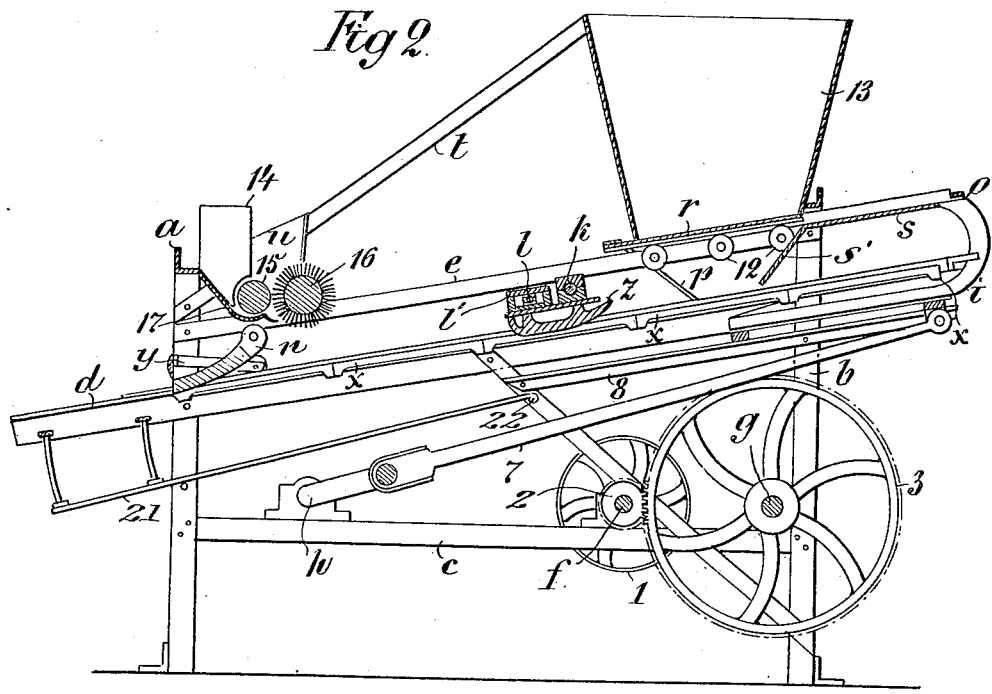

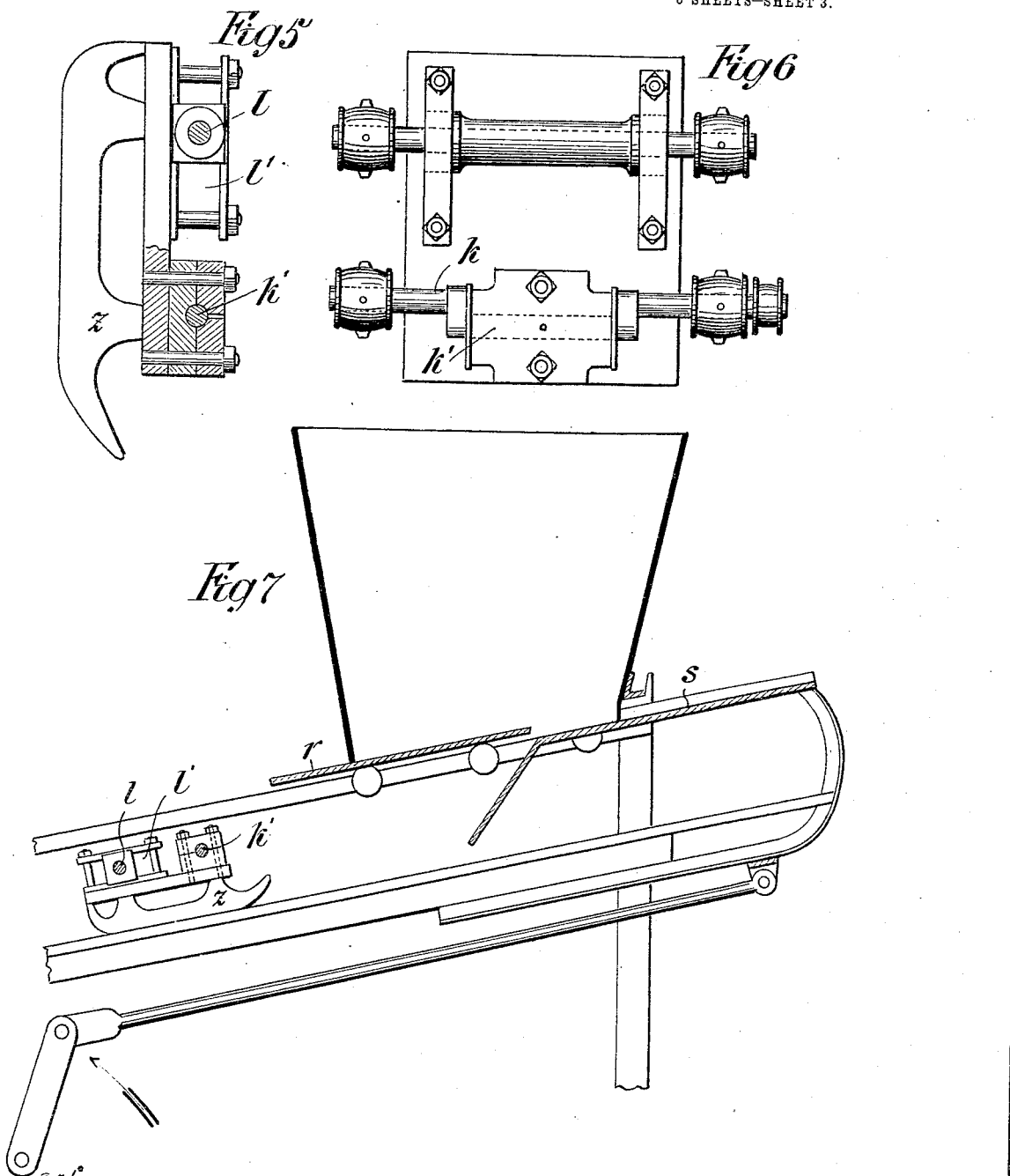

UNITED STATES PATENT OFFICE.

HANS HERMANSEN, OF RINGSTED, AND GELIUS ANDREAS KOFOED, OF RÖNNE, DENMARK.

MACHINE FOR PRODUCING INTERLOCKING TILES OF CEMENT.

1,118,281.  Specification of Letters Patent.  Patented Nov. 24, 1914.

Application filed February 15, 1912. Serial No. 677,838.

*To all whom it may concern:*

Be it known that we, HANS HERMANSEN and GELIUS ANDREAS KOFOED, subjects of the King of Denmark, residing, respectively, at Ringsted, Denmark, and Rönne, Denmark, have invented certain new and useful Improvements in Machines for Producing Interlocking Tiles of Cement, of which the following is a full, clear, and exact description.

The present invention relates to a machine for producing tiles of cement in which the cement mortar is automatically delivered from the filling hopper into molds traveling one behind the other underneath the same.

The principal object of our invention is to provide automatic means for cutting off mortar from a mass so that it can be formed into tiles or the like, such means being adjustable so as to cut off different quantities as required.

A further object of our invention is to provide means for compressing the raw material before the same hardens in a manner which will give the same effect as hand work.

A final object of our invention resides in the particular arrangement and combination of parts hereinafter described.

According to the invention, the hopper is provided on its underside with two plates connected with a slide which can be moved backward and forward and which accommodates the mold, which plates are placed one behind the other in the direction of motion of the slide and are mutually vertically displaced, corresponding to the amount of mortar to be conveyed, in such a manner that by one motion of the slide a layer is cut from the contents of the hopper and delivered into the mold and finally the hopper is completely closed. The machine embodying our invention also comprises a beater for compressing the mass delivered into the mold, said beater being suspended in front close to the crank of a crank shaft, and in the rear being suspended by means of a guide supported from a fixed shaft, by which the beater is controlled whereby the same performs a reciprocating sliding movement giving an effect similar to handwork.

An embodiment of our invention is shown in the accompanying drawings as an example.

In the drawing:—Figure 1 is a side view of the machine. Fig. 2 is a section on line A—A of Fig. 3. Fig. 3 is an end view of the machine and Fig. 4 is a section on line B—B of Fig. 1. Figs. 5–7 show details.

The frame of the machine consists of two vertical standards $a$ and $b$ connected by means of three sets of longitudinally extending girders $c$, $d$, and $e$, the girders $c$ carrying bearings for three shafts $f$, $g$ and $h$. The shaft $f$ carries a pulley 1 and a gear 2 meshing with the toothed wheel 3 on the shaft $g$ which latter also carries a small pulley 4 from which, by means of the belt 5 and the pulley 6, motion is transmitted to the crank shaft $h$. This shaft, by means of the connecting rod 7, is connected with one end of a sleigh or carrier $i$ sliding on two guiding rails 8 arranged underneath the girders $d$. Upon these girders $d$ are arranged adjustable bearings for a crank shaft $k$ serving for the operation of a beater $z$. The beater $z$ consists of a metal plate (having a profile corresponding to that of the object which is to be produced), one end of which, directed toward the mortar container is pointed, while its other end is rounded. The shaft $k$ is turned by means of the pulley 9, the belt 10 and the pulley 11 on the shaft $f$.

Figs. 5 and 6 show details regarding the beater $z$. The same is partly suspended directly on the crank $k'$ and has further a guide $l'$ in which the shaft $l$ can slide forward and backward. When the crank shaft is turned the shaft $l$ will slide forward and backward in the guide $l'$ and the beater $z$ will have imparted thereto an up and down, and a reciprocating movement in its guide, for pressing the mortar, etc., smoothly into the mold, leaving a smooth surface and preventing the mortar from sticking to the beater. By means of the adjustable bearings, the beater can be adjusted above the mold for the desired thickness of the tiles intended to be produced and at the same time it is possible to regulate the pressure to be exerted and thereby also the density of the stone. The girders $d$ furthermore carry a polisher $n$ pivotally arranged on a gudgeon which is also adjustable by means of screws.

The girders $e$ carry three pairs of rollers 12 on which slides a form $o$, the extreme rear end of which is connected with the upwardly directed end of the sleigh $i$ which by a stay or the like $p$ is connected also with the extreme front end of the frame $o$. On the frame $o$ is arranged a plate $r$ and a plate $s$ which latter is adjustable by means of screws or the like and carries in front an oblique plate $s'$. Over the frame $o$ is placed a container 13 into which the cement mortar is filled, said container being connected to the frame $a$ by means of a stay $t$ or the like. The plate $r$ closes the lowermost opening of the container 13 when the slide is in its outermost position (Fig. 2). The other plate $s$ is situated somewhat lower and ends in front about under the rearmost end of the plate $r$. On the foremost end of the plate $s$ is arranged the said oblique plate $s'$. When the slide moves forward (Fig. 7) the plate $r$ leaves the container at the bottom and the mortar mass sinks down onto the plate $s$. During the backward movement of the slide $o$ the hindmost edge of the plate $r$, which may be knife shaped, cuts off a layer of mortar corresponding to the vertical distance between the plates $r$ and $s$. Thereby the container 13 is also closed. The mortar layer resting on the plate $s$ is pushed into the mold at the same time as the backward movement of the slide and the oblique plate $s'$, by means of the lower rear edge of 13 which is arranged close to the top of $s$. In front of the apparatus is arranged a coloring device $u$ consisting of a paint container 14 provided with a roller 15 and behind the same is arranged a brush 16, the bristles of which glide over a wiper 17. The brush 16 is revolved by means of a chain 18, one end of which is connected to the frame $o$, while the other end is secured to a girder $v$ connected with the sleigh $i$. The chain 18 thus moves forward and backward with the frame $o$ and the sleigh $i$. Between the chain wheel and brush is arranged a pawl and ratchet drive so that the brush 16 is only allowed to turn in one direction.

Immediately in front of the polisher $n$ is arranged a swinging knife $y$, the rearwardly directed arm 20 of which is actuated by a pin 19 of the pulley 6 so that the knife $y$ will be carried down and will cut off one tile of the row of tiles upon each revolution of the pulley. In front of the knife $y$ is arranged a lifter 21 which is pivoted to the frame at 22, and which, for each revolution, is lifted by the crank shaft $h$.

The machine operates in the following manner:—After the container 13 has been filled with cement, mortar, or the like, and the container 14 with paint, an iron mold $x$ of the kind generally used in the manufacture of tile by hand is placed between the girder $d$ (Fig. 4) in front of the sleigh $i$ whereupon the machine is started. Upon the operation of the machine the mold $x$ is advanced for a distance which is equal to the length of one mold, hereafter the sleigh and at the same time the frame $o$ are returned. The plates $r$ will thereby cut off a layer of mortar from the container 13 whereupon said mortar slides down in the inclined plane $s$ into the mold $x$. Then another mold is placed on the girders $d$ and through the subsequent forward movement of the sleigh the iron molds together with their loads, will successively move forward. Hereby the mortar in the molds will step by step advance and be carried under the beater $z$ and the polisher $n$. Before the mold reaches its position under the polisher the molded mortar will be sprinkled with cement and paint from the brush 16. After the tile has been smoothed it is cut off from the row by means of the knife $y$ whereafter it is lifted by the lifter 21 and exposed to hardening.

Having thus described our invention what we claim is:—

1. A machine for producing tiles and the like comprising in combination a hopper, a reciprocable plate normally closing said hopper at the bottom, a second plate mounted to reciprocate in unison with said first plate, said second mentioned plate being arranged at one side of and upon a lower plane than said first plate, whereby plastic material in the hopper will rest upon the second plate when the first one is withdrawn, and means for pushing material off said second plate as said first plate returns to normal position.

2. A machine for producing tiles and the like comprising in combination, a hopper, a reciprocable plate normally closing said hopper at the bottom, a second plate mounted to reciprocate in unison with said first plate, said second mentioned plate being arranged at one side of and upon a lower plane than said first plate whereby plastic material in the hopper will rest upon the second plate when the first one is withdrawn, means for pushing material off said second plate as said first plate returns to normal position, and means for adjusting the vertical distance between said plates.

In witness whereof, we have subscribed our signatures in the presence of two witnesses.

HANS HERMANSEN.
GELIUS ANDREAS KOFOED.

Witnesses:
CECIL VILHELM SCHON,
F. PETERSEN.